(12) United States Patent
Fujita (10) Patent No.: US 11,187,894 B2
(45) Date of Patent: Nov. 30, 2021

(54) PROJECTION DISPLAY DEVICE, AND OPERATION METHOD AND OPERATION PROGRAM FOR PROJECTION DISPLAY DEVICE

(71) Applicant: FUJIFILM Corporation, Tokyo (JP)

(72) Inventor: Kodai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 487 days.

(21) Appl. No.: 16/297,741

(22) Filed: Mar. 11, 2019

(65) Prior Publication Data

US 2019/0204592 A1 Jul. 4, 2019

Related U.S. Application Data

(63) Continuation of application No. PCT/JP2017/032193, filed on Sep. 7, 2017.

(30) Foreign Application Priority Data

Sep. 28, 2016 (JP) .............................. JP2016-189400

(51) Int. Cl.
*G06F 7/00* (2006.01)
*G02B 27/00* (2006.01)
(Continued)

(52) U.S. Cl.
CPC .......... *G02B 27/0006* (2013.01); *B60K 35/00* (2013.01); *B60K 37/00* (2013.01);
(Continued)

(58) Field of Classification Search
CPC .... G02B 27/0006; B60K 35/00; B60K 37/00; B60K 37/02; B60K 37/04
(Continued)

(56) References Cited

U.S. PATENT DOCUMENTS 5,005,010 A * 4/1991 Misaki .................. G02B 27/01
340/980
6,542,305 B2 4/2003 Nakamura et al.
(Continued)

FOREIGN PATENT DOCUMENTS

CN 102608761 7/2012
CN 203267290 11/2013
(Continued)

OTHER PUBLICATIONS

"International Search Report (Form PCT/ISA/210) of PCT/JP2017/032193," dated Oct. 17, 2017, with English translation thereof, pp. 1-5.
(Continued)

*Primary Examiner* — Jonathan M Blancha
(74) *Attorney, Agent, or Firm* — JCIPRNET (57) ABSTRACT

An HUD includes a housing that accommodates a light modulation unit that spatially modulates light emitted by a light source; a projection optical system that is accommodated in the housing and projects the light that has been spatially modulated onto a windshield of a vehicle 1 through an opening portion of the housing; a cover that closes the opening portion; a protection member that is movable and is for protecting the cover; a driving unit that drives the protection member; and an object detecting unit that detects an object approaching a front surface of the cover. The driving unit moves the protection member to a position above the cover and causes the protection member to cover the cover when the object detecting unit detects an object, and the driving unit leaves the protection member retracted from the position above the cover to expose the cover when the object detecting unit does not detect an object.

20 Claims, 7 Drawing Sheets

(51) Int. Cl.
*B60K 37/04* (2006.01)
*B60K 37/00* (2006.01)
*B60K 35/00* (2006.01)
*B60K 37/02* (2006.01)
*G02B 27/01* (2006.01)
*G03B 21/20* (2006.01)
*G09G 3/00* (2006.01)

(52) U.S. Cl.
CPC .............. *B60K 37/02* (2013.01); *B60K 37/04* (2013.01); *G02B 27/0149* (2013.01); *B60K 2370/155* (2019.05); *B60K 2370/1529* (2019.05); *B60K 2370/334* (2019.05); *B60K 2370/50* (2019.05); *B60K 2370/682* (2019.05); *G02B 2027/0154* (2013.01); *G03B 21/2013* (2013.01); *G03B 21/2033* (2013.01); *G09G 3/002* (2013.01); *G09G 2380/10* (2013.01)

(58) Field of Classification Search
USPC .......................................................... 701/49
See application file for complete search history.

(56) References Cited

U.S. PATENT DOCUMENTS

| | | | |
|---|---|---|---|
| 7,652,825 | B2 | 1/2010 | Nakamura et al. |
| 8,953,247 | B2 | 2/2015 | Rumpf et al. |
| 9,599,747 | B2 | 3/2017 | Kuntze et al. |
| 9,690,096 | B2 | 6/2017 | Koseki et al. |
| 9,823,470 | B2 | 11/2017 | Ishikawa |
| 9,933,619 | B2 | 4/2018 | Watano et al. |
| 10,036,890 | B2 | 7/2018 | Yamaoka |
| 2007/0014547 | A1* | 1/2007 | Kasuya ................. G11B 19/04 386/200 |
| 2014/0293430 | A1 | 10/2014 | Takahashi |
| 2015/0309206 | A1* | 10/2015 | Kuntze ................. B60K 35/00 701/45 |
| 2017/0153451 | A1* | 6/2017 | Brandt ................. B60K 35/00 |

FOREIGN PATENT DOCUMENTS

| | | |
|---|---|---|
| CN | 104656254 | 5/2015 |
| CN | 105467584 | 4/2016 |
| CN | 105739097 | 7/2016 |
| EP | 2541303 | 1/2013 |
| JP | S63145726 | 9/1988 |
| JP | 2001097073 | 4/2001 |
| JP | 2002331855 | 11/2002 |
| JP | 2003237411 | 8/2003 |
| JP | 2007126049 | 5/2007 |
| JP | 2008040091 | 2/2008 |
| JP | 2008068767 | 3/2008 |
| JP | 2015031924 | 2/2015 |
| JP | 2015113088 | 6/2015 |
| JP | 2015535206 | 12/2015 |
| JP | 2016141272 | 8/2016 |
| WO | 2015182027 | 12/2015 |

OTHER PUBLICATIONS

"International Preliminary Report on Patentability (Form PCT/IPEA/409) of PCT/JP2017/032193," completed on Aug. 1, 2018, with English translation thereof, pp. 1-23.

"Office Action of China Counterpart Application" with English translation thereof, dated Jul. 15, 2021, p. 1-p. 26.

* cited by examiner

FIG. 7

PROJECTION DISPLAY DEVICE, AND OPERATION METHOD AND OPERATION PROGRAM FOR PROJECTION DISPLAY DEVICE

CROSS-REFERENCE TO RELATED APPLICATIONS

This application is a Continuation of PCT International Application No. PCT/JP2017/032193 filed on Sep. 7, 2017, which claims priority under 35 U.S.C § 119(a) to Japanese Patent Application No. 2016-189400 filed on Sep. 28, 2016. Each of the above application(s) is hereby expressly incorporated by reference, in its entirety, into the present application.

BACKGROUND OF THE INVENTION

1. Field of the Invention

The present invention relates to a projection display device, and an operation method and a non-transitory computer readable recording medium storing operation program for the projection display device.

2. Description of the Related Art

A head-up display (HUD) for a vehicle has been known. In the HUD, a combiner that is disposed on a windshield of a vehicle, such as an automobile, a train, a ship, a heavy machine, an aircraft, or an agricultural machine, or that is disposed near a position before the windshield is used as a screen, and light is projected onto the screen to display an image. The HUD enables a driver to visually recognize an image that is based on light projected from the HUD as a real image on the screen or as a virtual image in front of the screen.

JP2003-237411A discloses an HUD in which an openable/closable shutter portion is provided at an opening portion of a housing, the opening portion serving as a path of image light projected onto a screen, and in which, when not in use, the shutter portion is closed to prevent the entry of direct sunlight or the like into the opening portion.

JP2008-040091A discloses an HUD in which a transparent cover is provided at an opening portion of a housing to prevent the entry of a foreign object into the device.

SUMMARY OF THE INVENTION

An HUD mounted in an automobile is typically built in a dashboard and projects image light onto a windshield or combiner through an opening portion of a housing exposed on an upper surface of the dashboard.

An HUD mounted in an automobile typically has a cover formed of a transparent member and closing an opening portion of a housing to prevent the entry of an object, such as dirt, dust, or liquid, into the opening portion.

However, if a large object adheres to the cover closing the opening portion of the housing, projected light is blocked by the object, and the quality of a displayed image may degrade. When the object adhered to the cover is liquid, such as drink, and the liquid is left, the liquid collects sunlight while serving as a lens, resulting in deformation or discoloration of the cover.

In the HUD described in JP2003-237411A, the opening portion of the housing is closed with the shutter while the HUD is not being used. However, the shutter is at a position retracted from the opening portion of the housing while the HUD is being used, and thus it is impossible to prevent falling of an object into the opening portion of the housing.

In the HUD described in JP2008-040091A, an issue that may arise when an object is adhered to the transparent cover provided at the opening portion of the housing is not recognized, and no measures have been taken to prevent adhesion of an object to the transparent cover.

The present invention has been made in view of the above-described circumstances, and an object of the present invention is to provide a projection display device capable of preventing adhesion of an object to a cover closing an opening portion of a housing, and an operation method and a non-transitory computer readable recording medium storing an operation program for the same.

A projection display device of the present invention includes: a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; a protection member that is movable and is for protecting the cover; a driving unit that drives the protection member; and an object detecting unit that detects an object approaching a front surface of the cover, wherein the driving unit moves the protection member to a position above the cover and causes the protection member to cover the cover when the object detecting unit detects an object, and the driving unit leaves the protection member retracted from the position above the cover to expose the cover when the object detecting unit does not detect an object.

An operation method for a projection display device of the present invention is an operation method for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a protection member that is movable and is for protecting the cover, the operation method including: an object detection step of detecting an object approaching a front surface of the cover; and a driving step of moving the protection member to a position above the cover and causing the protection member to cover the cover when the object detection step detects an object, and of leaving the protection member retracted from the position above the cover to expose the cover when the object detection step does not detect an object.

A non-transitory computer readable recording medium storing an operation program for a projection display device of the present invention is an operation program for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a protection member that is movable and is for protecting the cover, the operation program causing a computer to execute: a driving step of moving the protection member to a position above the cover and causing the protection member to cover the cover when an object approaching a front surface of the cover is detected, and of leaving the protection member retracted from the position above the cover to expose the cover when the object is not detected.

According to the present invention, it is possible to provide a projection display device capable of preventing adhesion of an object to a cover closing an opening portion of a housing, and an operation method and a non-transitory computer readable recording medium storing an operation program for the same.

DESCRIPTION OF THE PREFERRED EMBODIMENTS

Hereinafter, an embodiment of the present invention will be described with reference to the drawings.

Figure 1:
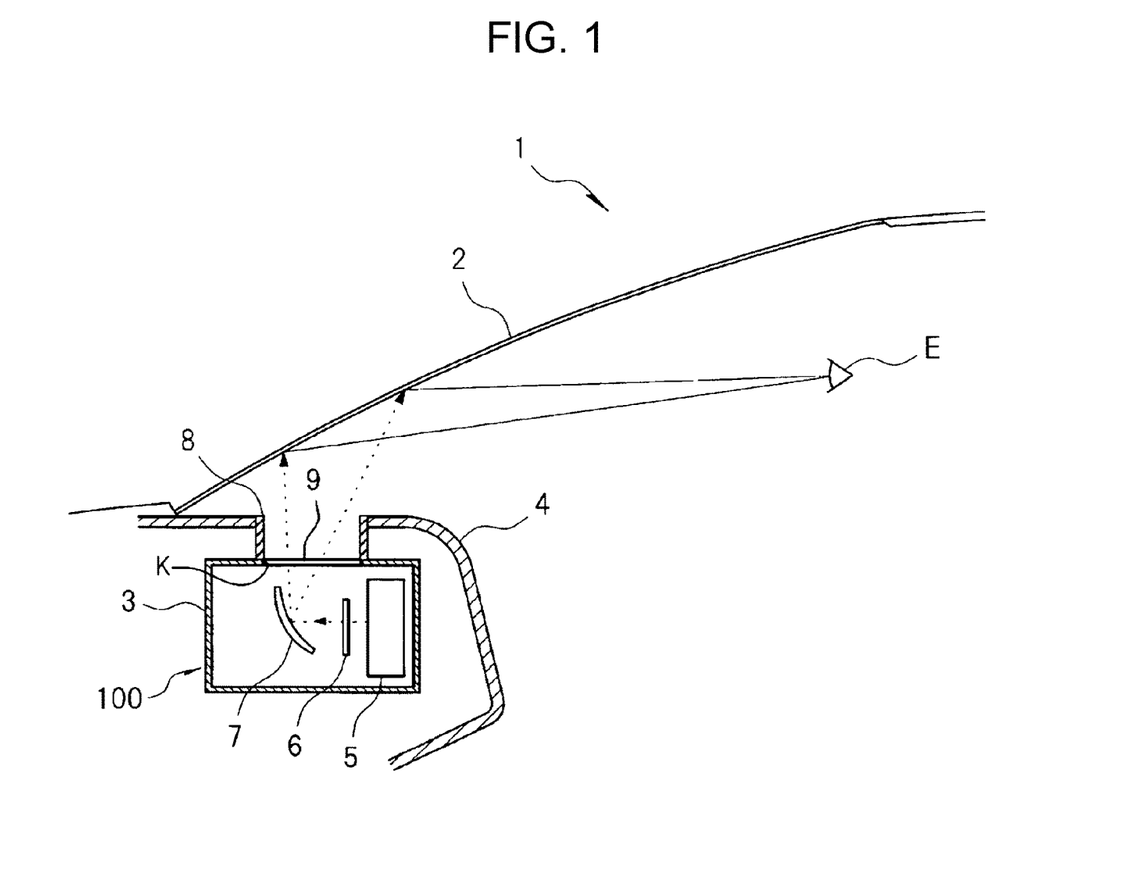
FIG. 1 is a diagram illustrating a schematic configuration of an HUD 100, which is an embodiment of a projection display device of the present invention.

FIG. 1 is a diagram illustrating a schematic configuration of a head-up display (HUD) 100, which is an embodiment of a projection display device of the present invention.

The HUD 100 is mounted in an automobile 1, uses a range of a part of a windshield 2 of the automobile 1 as a projection surface, and enables a driver of the automobile 1 to visually recognize a virtual image or real image by using image light projected onto the projection surface.

The HUD 100 may be used by being mounted in a vehicle, such as a train, a heavy machine, a construction machine, an aircraft, a ship, or an agricultural machine, as well as an automobile.

The HUD 100 is built in a dashboard 4 of the automobile 1 such that a part of the HUD 100 is exposed. The dashboard 4 is a member that contains, in its inside, built-in components including gauges for presenting information necessary for driving, such as a speedometer, a tachometer, a fuel gauge, a water temperature gauge, an odometer, or the like of the automobile 1.

The HUD 100 includes a box-shaped housing 3 and a tubular connecting portion 8 that connects the housing 3 and an opening portion of the dashboard 4 to each other. The housing 3 accommodates a control unit 5 that includes a light source and a light modulation unit that spatially modulates, in accordance with image data, light emitted by the light source; and a diffusion member 6 and a concave mirror 7 that constitute a projection optical system that projects, onto the windshield 2, image light that has been spatially modulated by the light modulation unit. The configuration of the projection optical system is an example and is not limited to that illustrated in FIG. 1.

The housing 3 has an opening portion K. A portion around the opening portion K of the housing 3 and the opening portion of the dashboard 4 are connected to each other by the connecting portion 8.

The diffusion member 6 is a member that diffuses the image light that has been spatially modulated by the light modulation unit of the control unit 5, thereby making a plane light source. As the diffusion member 6, a micromirror array having a fine structure on its surface, a diffusion mirror, a microlens-array (MLA) diffuser, a reflection holographic diffuser, or the like is used.

The concave mirror 7 enlarges the image light diffused by the diffusion member 6 and reflects the image light toward the projection surface of the windshield 2. The image light reflected by the concave mirror 7 passes through the opening portion K of the housing 3 and a hollow portion of the connecting portion 8 and is projected toward the projection surface of the windshield 2.

The windshield 2 is designed so that the image light projected through the opening portion K and the hollow portion of the connecting portion 8 is reflected in the direction of eyes E of the driver. The image light is reflected by the windshield 2 and enter the eyes E of the driver. Accordingly, the driver is able to visually recognize an image (virtual image or real image) that is based on the image light.

The opening portion K of the housing 3 is closed with a cover 9 made of resin, glass, or the like and allowing image light to pass therethrough. The opening portion K is an emission window for allowing image light reflected by the concave mirror 7 to be emitted from the housing 3. The cover 9 is a member that prevents the entry of an object, such as dirt, dust, or liquid, into the housing 3 through the opening portion K.

The HUD 100 adopts a scheme of projecting image light onto the windshield 2. Alternatively, the HUD 100 may adopt a scheme of projecting image light onto a combiner (not illustrated) disposed before the windshield 2. In this case, the combiner constitutes a projection surface.

Figure 2:
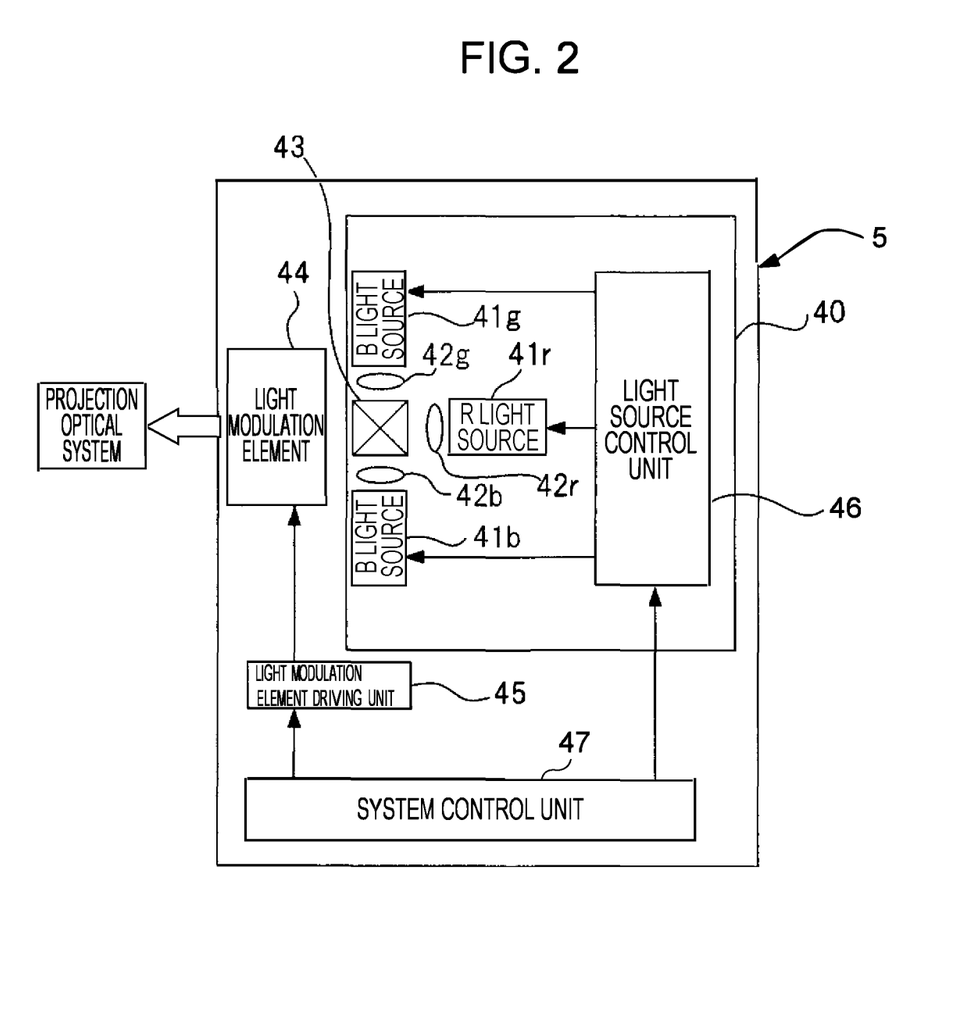
FIG. 2 is a schematic diagram illustrating an example of an internal configuration of a control unit 5 accommodated in a housing 3 of the HUD 100 illustrated in FIG. 1.

FIG. 2 is a schematic diagram illustrating an example of an internal configuration of the control unit 5 accommodated in the housing 3 of the HUD 100 illustrated in FIG. 1.

As illustrated in FIG. 2, the control unit 5 of the HUD 100 includes a light source unit 40, a light modulation element 44, a light modulation element driving unit 45 that drives the light modulation element 44, and a system control unit 47 that centrally controls the entire HUD 100.

The system control unit 47 includes a processor, a read only memory (ROM) storing a program or the like executed by the processor, and a random access memory (RAM) functioning as a work memory of the processor. The program stored in the ROM includes an operation program for the HUD 100. The processor of the system control unit 47 executes the operation program, thereby executing a driving step which will be described below.

The light source unit 40 includes a light source control unit 46, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 100.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 100 is not limited to the three light sources, that is, the R light source 41r, the G light source 41g, and the B light source 41b, and may be constituted by one light source, two light sources, or four or more light sources.

The light source control unit 46 controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 47, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The light modulation element driving unit 45 drives the light modulation element 44 in accordance with image data received from the system control unit 47 and causes image light that has been spatially modulated in accordance with the image data (red image light, blue image light, and green image light) to be emitted from the light modulation element 44 to the diffusion member 6 of the projection optical system. The light modulation element 44 and the light modulation element driving unit 45 constitute a light modulation unit of the HUD 100.

The projection optical system constituted by the diffusion member 6 and the concave mirror 7 illustrated in FIG. 1 is optically designed so that an image that is based on image light projected onto the windshield 2 can be visually recognized by the driver as a virtual image at a position in front of the windshield 2. The projection optical system may be optically designed so that the image that is based on the image light can be visually recognized by the driver as a real image on the windshield 2.

The system control unit 47 controls the light source control unit 46 and the light modulation element driving unit 45 and causes image light that has been spatially modulated in accordance with image data to be emitted to the diffusion member 6.

Figure 3:
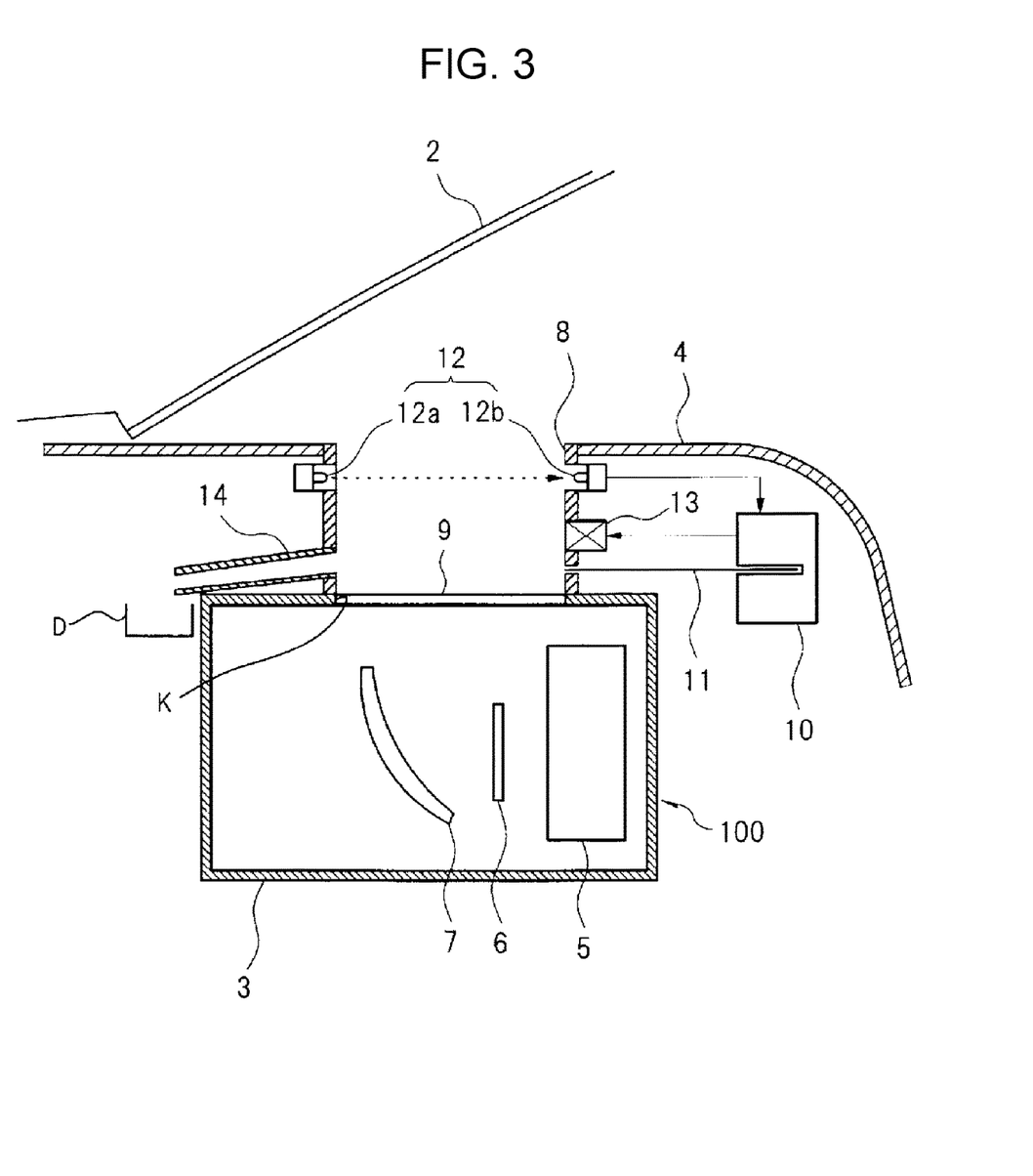
FIG. 3 is an enlarged view illustrating a more detailed configuration of the HUD 100 illustrated in FIG. 1.

FIG. 3 is an enlarged view illustrating a more detailed configuration of the HUD 100 illustrated in FIG. 1.

As illustrated in FIG. 3, the HUD 100 includes the housing 3, the connecting portion 8, a movable protection member 11, a driving unit 10 that drives the protection member 11, an object detecting unit 12, an object removing unit 13, a discharge unit 14, and a dust box D.

The protection member 11 is a member for protecting the cover 9 and is supported by the driving unit 10 so as to be insertable to and retractable from a position above the cover 9 in the hollow portion of the connecting portion 8. The protection member 11 is formed of, for example, a thin plate having a planar shape that is substantially the same as that of the cover 9.

The driving unit 10 is connected to the system control unit 47 of the control unit 5 illustrated in FIG. 2 and drives the protection member 11 in accordance with an instruction from the system control unit 47.

The driving unit 10 drives the protection member 11 to switch between a state where the protection member 11 has been moved to a position above the cover 9 and the cover 9 is covered with the protection member 11; and a state where the protection member 11 has been retracted from the position above the cover 9 and the cover 9 is exposed.

The object detecting unit 12 detects the presence/absence of an object that falls from the inside of the automobile 1 into the hollow portion of the connecting portion 8 and approaches a front surface of the cover 9. The object detecting unit 12 is built in an inner wall of the connecting portion 8 at an upper position relative to the protection member 11 in a state where the protection member 11 covers the cover 9.

The object detecting unit 12 is constituted by, for example, a transmissive sensor having a light transmitting unit formed of a light emitting element 12a disposed in one side of the inner wall of the connecting portion 8 whose planar shape is rectangular; and a light receiving unit formed of a light receiving element 12b disposed in the other side facing the one side of the inner wall.

The light emission state of the light emitting element 12a of the object detecting unit 12 is controlled by the system control unit 47 of the control unit 5 illustrated in FIG. 2.

The light receiving element 12b of the object detecting unit 12 is connected to the system control unit 47 of the control unit 5 illustrated in FIG. 2. When light emitted by the light emitting element 12a reaches the light receiving element 12b, an electric signal indicating that no object has been detected is input from the light receiving element 12b to the system control unit 47.

The object detecting unit 12 may be constituted by, instead of the above-described transmissive sensor, a retro-reflective sensor that detects an object in accordance with the presence/absence of reflected light of light emitted by a light transmitting unit toward a reflection plate, a diffuse-reflective sensor that detects an object in accordance with the presence/absence of reflected light of light emitted by a light transmitting unit toward the object, or the like, for example.

Figure 4:
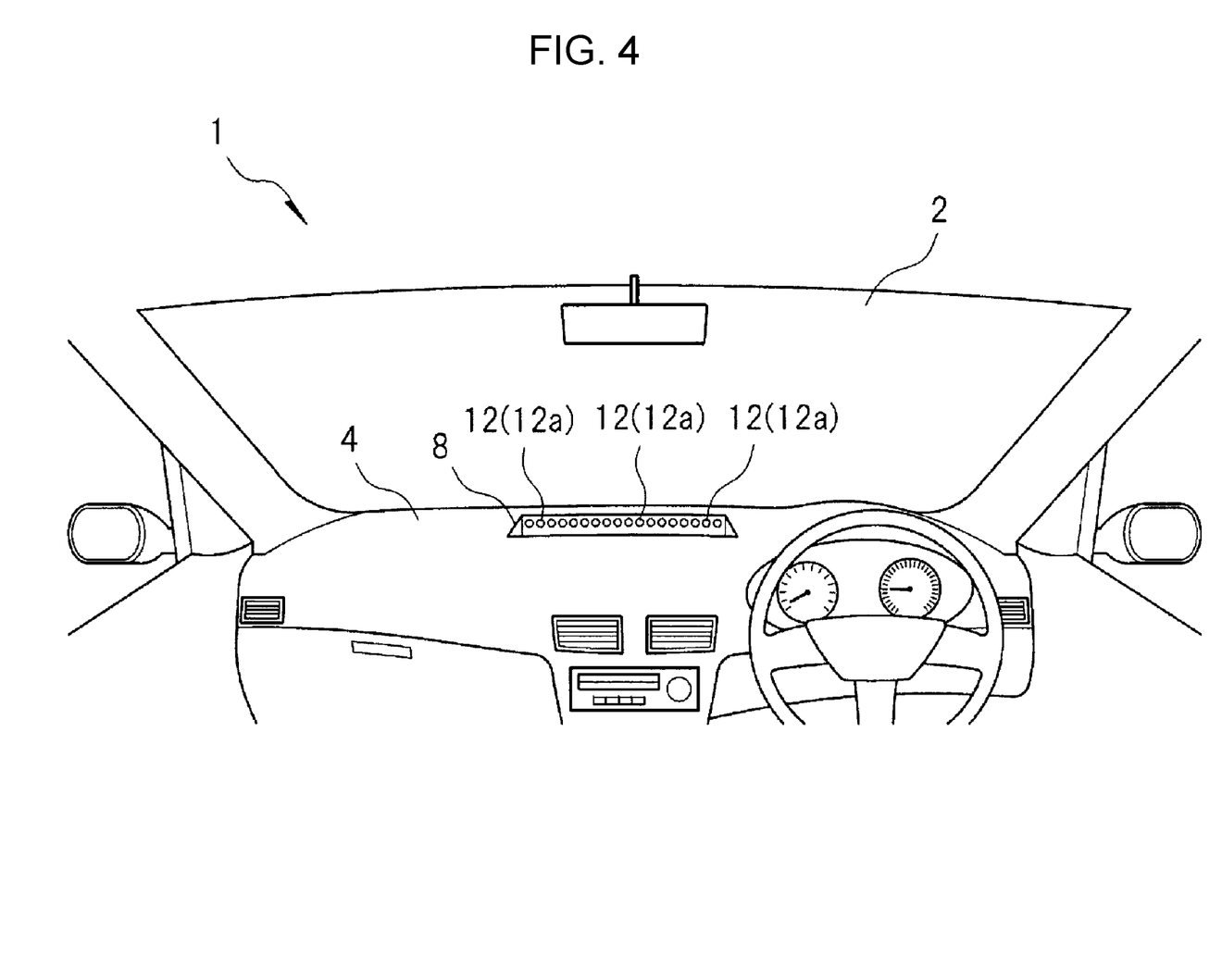
FIG. 4 is a diagram illustrating an external appearance of the HUD 100 illustrated in FIG. 1.

FIG. 4 is a diagram illustrating an external appearance of the HUD 100 illustrated in FIG. 1.

As illustrated in FIG. 4, the connecting portion 8 of the HUD 100 has a rectangular planar shape whose long sides extend in a direction in which a driver's seat and a passenger seat of the automobile 1 are arranged. Many pairs of the light emitting element 12a and the light receiving element 12b constituting the object detecting unit 12 are arranged at small intervals along the long sides facing each other of the connecting portion 8. Thus, no matter where an object falls in the hollow portion of the connecting portion 8, the presence/absence thereof can be detected.

The many pairs of the light emitting element 12*a* and the light receiving element 12*b* constituting the object detecting unit 12 may be arranged at small intervals along short sides facing each other of the connecting portion 8. In the case of this configuration, the number of pairs of the light emitting element 12*a* and the light receiving element 12*b* can be reduced, and the cost can be reduced.

The pairs of the light emitting element 12*a* and the light receiving element 12*b* may be arranged along the entire circumference of the inner wall of the connecting portion 8. In the case of this configuration, the accuracy of object detection can be increased.

When receiving an instruction to turn off the power of the HUD 100, the system control unit 47 controls the driving unit 10 to move the protection member 11 to a position above the cover 9, and turns off the power of the system in a state where the cover 9 is completely covered with the protection member 11.

When the power of the HUD 100 is turned on, the system control unit 47 controls the driving unit 10 to retract the protection member 11 from the position above the cover 9, and controls the light emitting element 12*a* of the object detecting unit 12 to be in a light emission state in a state where the cover 9 is exposed.

In a state where the light emitting element 12*a* of the object detecting unit 12 is controlled to be in a light emission state, when the light travelling from the light emitting element 12*a* toward the light receiving element 12*b* is blocked and the supply of an electric signal from the light receiving element 12*b* is shut off, the system control unit 47 determines that an object approaching the cover 9 has been detected and controls the driving unit 10 to move the protection member 11 to the position above the cover 9, thereby preventing adhesion of the object to the cover 9.

As illustrated in FIG. 3, the object removing unit 13 is built in the inner wall of the connecting portion 8 at an upper position relative to the protection member 11 in a state where the protection member 11 covers the cover 9.

The object removing unit 13 is equipped with a blower function of blowing wind onto a front surface of the protection member 11, for example, and forcibly moves an object adhered to the front surface of the protection member 11 toward the discharge unit 14.

When the object adhered to the front surface of the protection member 11 is liquid, the object removing unit 13 is able to forcibly move the liquid toward the discharge unit 14 and to evaporate the liquid remaining on the front surface of the protection member 11 by using wind.

The object removing unit 13 may be constituted by, instead of a unit equipped with the above-described blower function, an electric brush or an air suction mechanism or the like attached to the discharge unit 14 side, for example.

The discharge unit 14 discharges an object adhered to the front surface of the protection member 11 to the outside of the hollow portion of the connecting portion 8.

The discharge unit 14 is constituted by a hole portion in the inner wall of the connecting portion 8, a tubular member connected to the hole portion, and the dust box D disposed near an exit of a hollow portion of the tubular member, the hole portion being provided at a position facing an end portion of the protection member 11 in a state where the protection member 11 covers the cover 9.

An object that has been moved to the hole portion of the discharge unit 14 from the front surface of the protection member 11 passes through the hollow portion of the tubular member of the discharge unit 14 and is discharged into the dust box D. Preferably, the dust box D is detachable.

Next, an operation of the HUD 100 illustrated in FIGS. 1 to 3 will be described.

When the power of the HUD 100 is turned on, the system control unit 47 performs control to cause the protection member 11 to be retracted to the position illustrated in FIG. 3 and the cover 9 is exposed, so that an image based on image light can be displayed. In this state, the system control unit 47 controls the light emitting element 12*a* of the object detecting unit 12 to be in a light emission state.

When an object falls into the hollow portion of the connecting portion 8 from above the connecting portion 8 of the housing 3, light traveling from the light emitting element 12*a* of the object detecting unit 12 toward the light receiving element 12*b* is blocked and thus the object is detected, so that the supply of an electric signal from the light receiving element 12*b* to the system control unit 47 is shut off.

Figure 5:
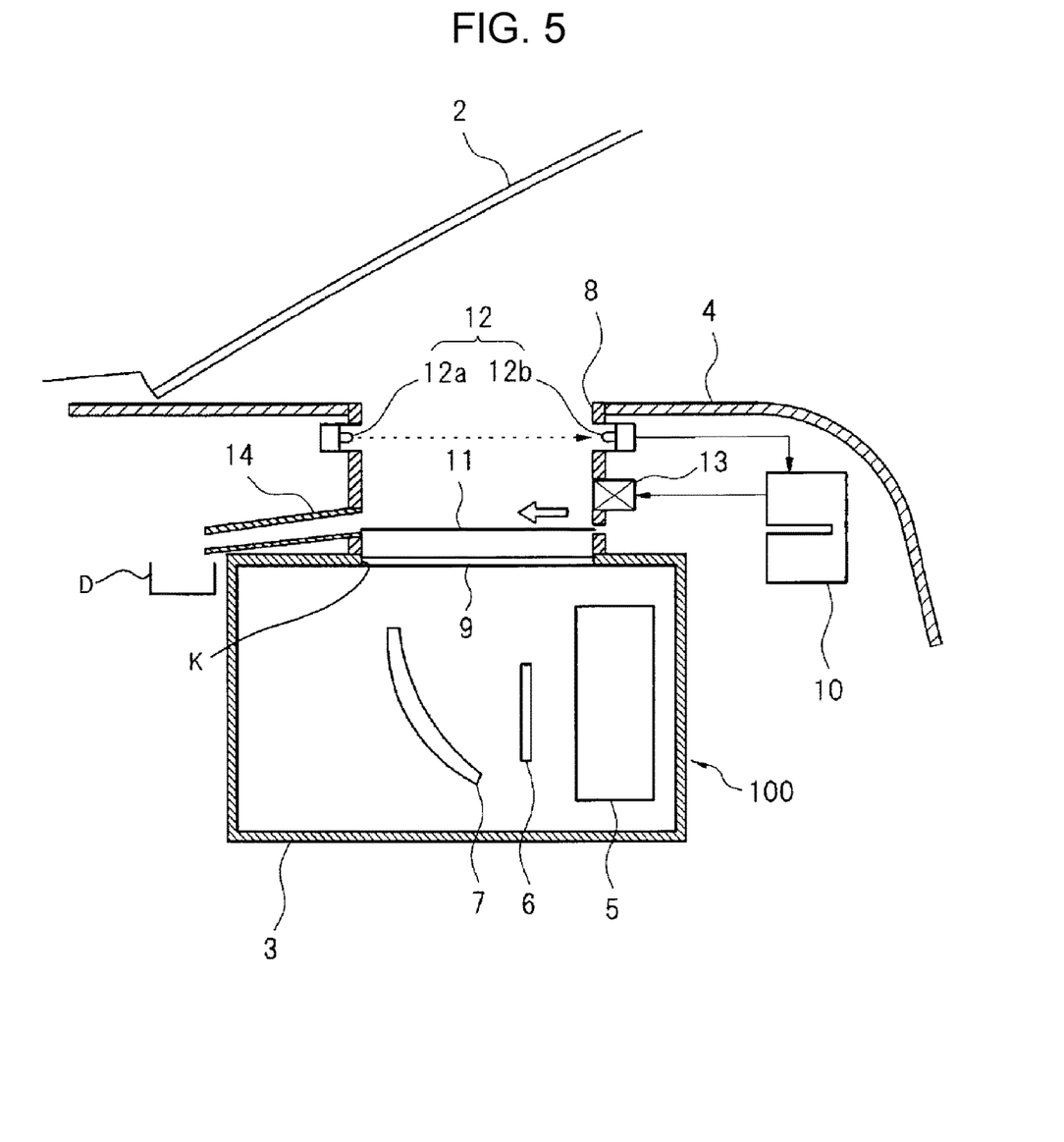
FIG. 5 is a schematic diagram for describing an operation of the HUD 100 illustrated in FIG. 1.

When the supply of an electric signal from the object detecting unit 12 is not shut off, the system control unit 47 controls the protection member 11 to be in a state retracted from the position above the cover 9. When the supply of an electric signal from the object detecting unit 12 is shut off, the system control unit 47 performs a driving step of controlling the driving unit 10 to move the protection member 11 to the position above the cover 9, as illustrated in FIG. 5. Accordingly, the object fallen into the hollow portion of the connecting portion 8 adheres to the front surface of the protection member 11 before reaching the front surface of the cover 9.

In addition, in the state illustrated in FIG. 5 where the protection member 11 has been moved to the position above the cover 9, the system control unit 47 controls the object removing unit 13 to blow wind onto the front surface of the protection member 11. Accordingly, the object adhered to the front surface of the protection member 11 is moved to the discharge unit 14 and is removed from the front surface of the protection member 11.

When a sufficient period of time for discharging the object to the discharge unit 14 by the object removing unit 13 elapses from when the protection member 11 is moved to the position above the cover 9, the system control unit 47 determines that the object has been removed, controls the driving unit 10 to retract the protection member 11 from the position above the cover 9, and stops the object removing unit 13.

As described above, according to the HUD 100, even when an object falls into the hollow portion of the connecting portion 8 of the housing 3, the protection member 11 covers the cover 9 and thus adhesion of the object to the front surface of the cover 9 can be prevented. Thus, driving assistance by the HUD 100 can be continued without degrading the display quality of image light projected onto the windshield 2. In particular, when the object is liquid, the liquid does not remain on the front surface of the cover 9, change in quality of the cover 9 caused by sunlight radiation or the like can be prevented, and the quality of an image displayed by the HUD 100 can be maintained.

With the configuration having the object removing unit 13 and the discharge unit 14, the HUD 100 is able to automatically remove an object adhered to the front surface of the protection member 11 and to keep the front surface of the protection member 11 clean.

After the removal of the object is completed by the object removing unit 13, the HUD 100 causes the protection member 11 to be retracted from the position above the cover 9. Thus, a situation can be prevented from occurring where retraction of the protection member 11 is started in a state where an object is adhered to the protection member 11 and the object adhered to the front surface of the protection member 11 falls onto the front surface of the cover 9 during the retraction.

Figure 6:
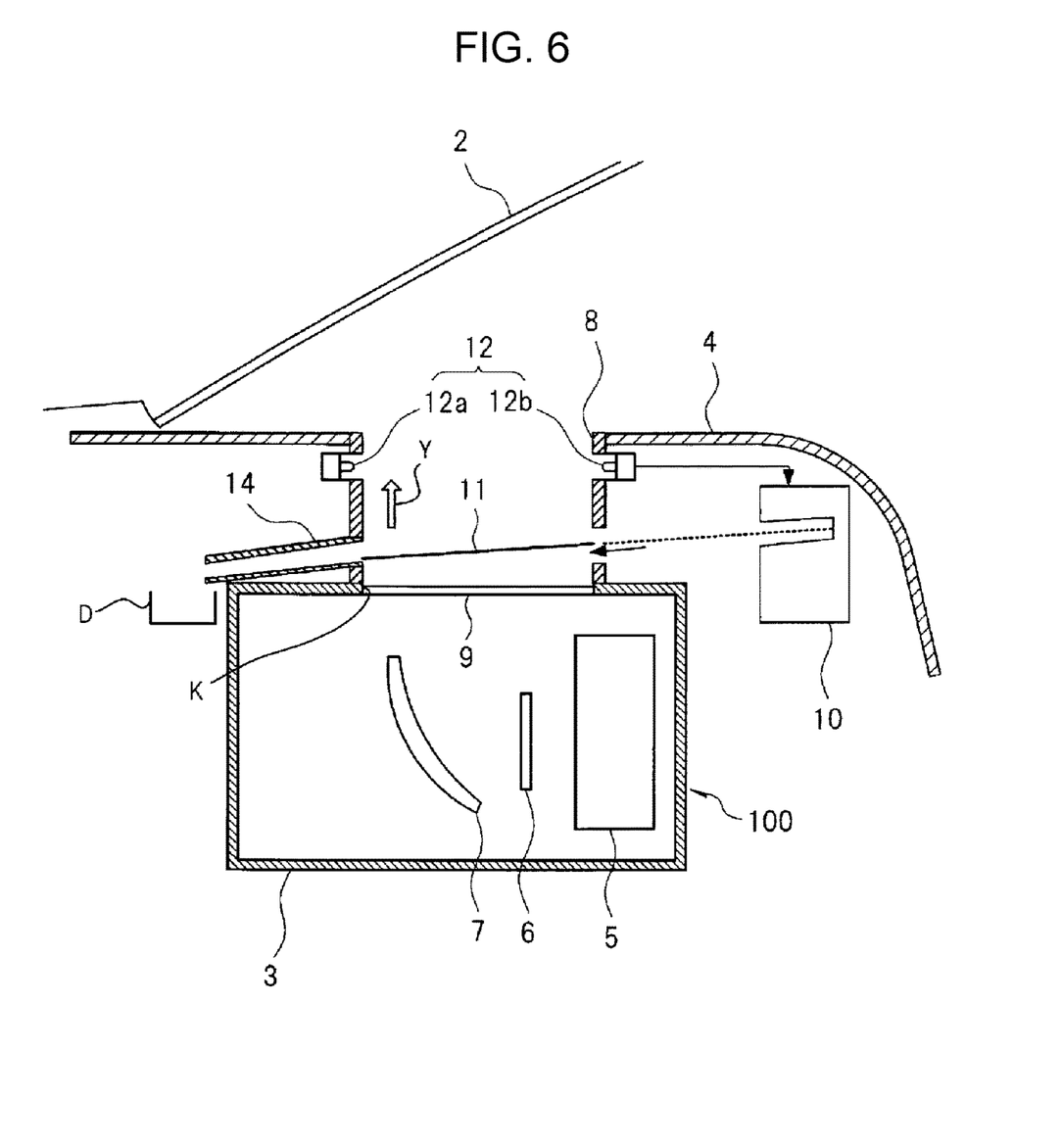
FIG. 6 is a schematic diagram illustrating a schematic configuration of a modification example of the HUD 100 illustrated in FIG. 1 and is a diagram corresponding to FIG. 5.

FIG. 6 is a schematic diagram illustrating a schematic configuration of a modification example of the HUD 100 illustrated in FIG. 1 and is a diagram corresponding to FIG. 5.

The HUD 100 illustrated in FIG. 6 has the same configuration as that of the HUD 100 illustrated in FIG. 1 except that, in a state where the protection member 11 covers the cover 9, the front surface of the protection member 11 is inclined with respect to the plane perpendicular to a projection direction Y of image light projected toward the windshield 2 and the object removing unit 13 is not provided.

The discharge unit 14 of the HUD 100 illustrated in FIG. 6 is disposed at a position facing an end portion closer to the cover 9 of the protection member 11, out of end portions of the protection member 11 in an inclination direction. Thus, an object adhered to the front surface of the protection member 11 can be naturally moved to the discharge unit 14 along the inclination of the protection member 11. Accordingly, even when the object removing unit 13 for forcibly moving an object to the discharge unit 14 is not provided, the object can be discharged to the outside of the housing 3 through the discharge unit 14.

Preferably, the HUD 100 of the modification example illustrated in FIG. 6 further includes the object removing unit 13 illustrated in FIG. 3. With the object removing unit 13 being added, an object adhered to the front surface of the protection member 11 can be quickly moved to the discharge unit 14, and a period of time over which image light travelling toward the windshield 2 is blocked by the protection member 11 can be shortened.

Preferably, the protection member 11 described so far is made of a material that allows image light to pass therethrough, like the cover 9. With this configuration, even in a state where an object has been detected by the object detecting unit 12 and the protection member 11 completely covers the cover 9, projection of a most part of image light to the windshield 2 can be continued and driving assistance can be partially continued.

The protection member 11 may be made of a material capable of reflecting or absorbing visible light or may be coated with such a material. With this configuration, while the power of the HUD 100 is in an OFF state and the protection member 11 completely covers the cover 9, the incidence of sunlight onto the cover 9 can be prevented and chronological change in the cover 9 can be reduced.

As described above, when the protection member 11 is made of a material capable of reflecting or absorbing visible light or is coated with such a material, an image is not displayed by the HUD 100 in a state where the object detecting unit 12 has detected an object and the protection member 11 completely covers the cover 9.

Figure 7:
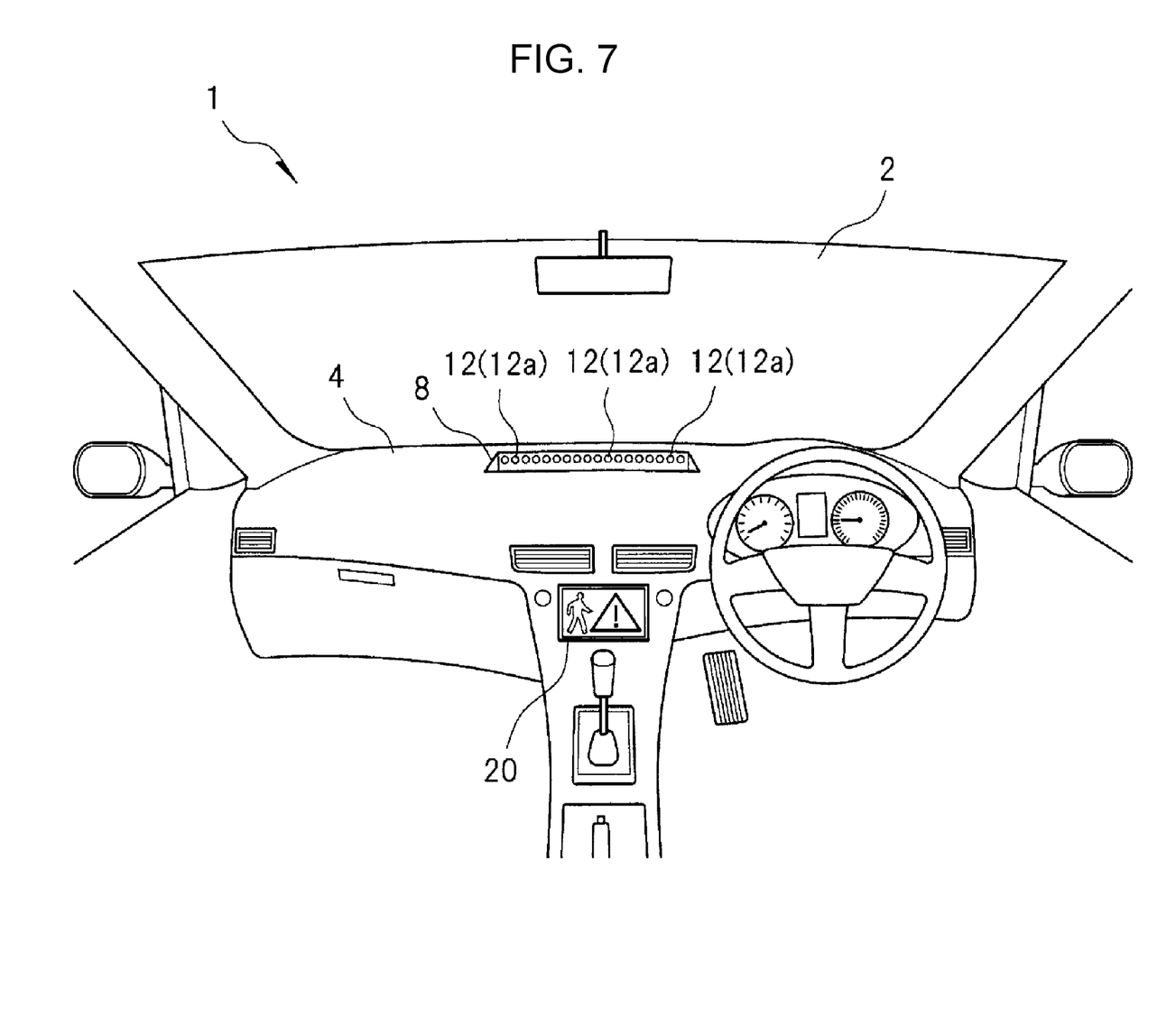
FIG. 7 is a schematic diagram for describing the modification example of the HUD 100 illustrated in FIG. 1.

In this case, it is preferable that the system control unit 47 output image data that has been input to the light modulation element driving unit 45 to a display device 20 different from the HUD 100 mounted in the automobile 1, as illustrated in FIG. 7, and cause the display device 20 to display an image that is based on the image data. In the case of this configuration, the system control unit 47 functions as a display control unit.

With this configuration, even in a state where image light to be projected onto the windshield 2 is blocked by the protection member 11, driving assistance can be continued by using the display device 20.

In the description given above, the system control unit 47 causes the protection member 11 to be retracted from the position above the cover 9 when removal of an object is completed by the object removing unit 13, but the retraction of the protection member 11 may be performed by the system control unit 47 in response to an instruction from a user.

In the description given above, the system control unit 47 determines, in accordance with the period of time elapsed from when the protection member 11 is moved to the position above the cover 9, that removal of an object has been completed by the object removing unit 13, but the present invention is not limited thereto.

For example, an imaging unit that captures an image of the front surface of the protection member 11 is added to the HUD 100. The system control unit 47 analyzes a captured image signal output from the imaging unit to determine whether or not an object has been removed, and starts retracting the protection member 11 upon determining that the object has been removed. With this configuration, the possibility that an object remaining on the protection member 11 falls onto the cover 9 can be further decreased.

As described above, this specification discloses the followings.

(1) A projection display device including: a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; a protection member that is movable and is for protecting the cover; a driving unit that drives the protection member; and an object detecting unit that detects an object approaching a front surface of the cover, wherein the driving unit moves the protection member to a position above the cover and causes the protection member to cover the cover when the object detecting unit detects an object, and the driving unit leaves the protection member retracted from the position above the cover to expose the cover when the object detecting unit does not detect an object.

(2) The projection display device described in (1), further including an object removing unit that removes an object adhered to a front surface of the protection member in a state where the object detecting unit has detected the object and the driving unit has moved the protection member to the position above the cover.

(3) The projection display device described in (1), wherein the protection member is inclined with respect to a plane perpendicular to a projection direction of the light projected through the opening portion, and the projection display device further includes a discharge unit to which an object adhered to a front surface of the protection member is to be discharged, the discharge unit being provided at a position facing an end portion closer to the opening portion out of end portions of the protection member in an inclination direction in a state where the protection member covers the cover.

(4) The projection display device described in (3), further including an object removing unit that moves the object adhered to the front surface of the protection member to the discharge unit to remove the object in a state where the object detecting unit has detected the object and the driving unit has moved the protection member to the position above the cover.
(5) The projection display device described in (2) or (4), wherein the driving unit retracts the protection member from the position above the cover after the object removing unit completes removing the object.
(6) The projection display device described in any one of (1) to (5), further including a display control unit that causes a display device mounted in the vehicle to display an image that is based on the image data in a state where the object detecting unit has detected the object and the driving unit has moved the protection member to the position above the cover.
(7) The projection display device described in any one of (1) to (5), wherein the protection member allows the light that has been spatially modulated to pass therethrough.
(8) An operation method for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a protection member that is movable and is for protecting the cover, the operation method including: an object detection step of detecting an object approaching a front surface of the cover; and a driving step of moving the protection member to a position above the cover and causing the protection member to cover the cover when the object detection step detects an object, and of leaving the protection member retracted from the position above the cover to expose the cover when the object detection step does not detect an object.
(9) The operation method for the projection display device described in (8), further including an object removal step of removing an object adhered to a front surface of the protection member in a state where the driving step has moved the protection member to the position above the cover.
(10) The operation method for the projection display device described in (8), wherein the protection member is inclined with respect to a plane perpendicular to a projection direction of the light projected through the opening portion, and the projection display device further has a discharge unit to which an object adhered to a front surface of the protection member is to be discharged, the discharge unit being provided at a position facing an end portion closer to the opening portion out of end portions of the protection member in an inclination direction in a state where the protection member covers the cover.
(11) The operation method for the projection display device described in (10), further including an object removal step of moving the object adhered to the front surface of the protection member to the discharge unit to remove the object in a state where the driving step has moved the protection member to the position above the cover.
(12) The operation method for the projection display device described in (9) or (11), further including a step of retracting the protection member from the position above the cover after the object removal step is completed.
(13) The operation method for the projection display device described in any one of (8) to (12), further including a display control step of causing a display device mounted in the vehicle to display an image that is based on the image data in a state where the driving step has moved the protection member to the position above the cover.
(14) The operation method for the projection display device described in any one of (8) to (12), wherein the protection member allows the light that has been spatially modulated to pass therethrough.
(15) An operation program for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a protection member that is movable and is for protecting the cover, the operation program causing a computer to execute: a driving step of moving the protection member to a position above the cover and causing the protection member to cover the cover when an object approaching a front surface of the cover is detected, and of leaving the protection member retracted from the position above the cover to expose the cover when the object is not detected.

The present invention is able to increase the product value of a vehicle when applied to the vehicle, such as an automobile.

REFERENCE SIGNS LIST

100 HUD
1 automobile
2 windshield
3 housing
4 dashboard
5 control unit
6 diffusion member
7 concave mirror
8 connecting portion
9 cover
10 driving unit
11 protection member
12 object detecting unit
12a light emitting element
12b light receiving element
13 object removing unit
14 discharge unit
20 display device
40 light source unit
41r R light source
41g G light source
41b B light source
42r, 42g, 42b collimator lens
43 dichroic prism
44 light modulation element
45 light modulation element driving unit
46 light source control unit
47 system control unit
E eyes
K opening portion
D dust box
Y projection direction

What is claimed is:

1. A projection display device comprising:
a light modulation unit that spatially modulates, in accordance with image data that is input, light emitted by a light source;
a housing that accommodates the light modulation unit;
a projection optical system that is accommodated in the housing and projects the light that has been spatially modulated onto a projection surface of a vehicle through an opening portion of the housing;
a cover that closes the opening portion;
a protection member that is movable and is for protecting the cover;
a driving unit that drives the protection member; and
an object detecting unit that detects an object approaching a front surface of the cover, wherein
the driving unit moves the protection member to a position above the cover and causes the protection member to cover the cover when the object detecting unit detects an object, and the driving unit leaves the protection member retracted from the position above the cover to expose the cover when the object detecting unit does not detect an object.

2. The projection display device according to claim 1, further comprising:
an object removing unit that removes an object adhered to a front surface of the protection member in a state where the object detecting unit has detected the object and the driving unit has moved the protection member to the position above the cover.

3. The projection display device according to claim 2, wherein
the driving unit retracts the protection member from the position above the cover after the object removing unit completes removing the object.

4. The projection display device according to claim 2, further comprising:
a display control unit that causes a display device mounted in the vehicle to display an image that is based on the image data in a state where the object detecting unit has detected the object and the driving unit has moved the protection member to the position above the cover.

5. The projection display device according to claim 1, wherein
the protection member is inclined with respect to a plane perpendicular to a projection direction of the light projected through the opening portion, and
the projection display device further comprises a discharge unit to which an object adhered to a front surface of the protection member is to be discharged, the discharge unit being provided at a position facing an end portion closer to the opening portion out of end portions of the protection member in an inclination direction in a state where the protection member covers the cover.

6. The projection display device according to claim 5, further comprising:
an object removing unit that moves the object adhered to the front surface of the protection member to the discharge unit to remove the object in a state where the object detecting unit has detected the object and the driving unit has moved the protection member to the position above the cover.

7. The projection display device according to claim 6, wherein
the driving unit retracts the protection member from the position above the cover after the object removing unit completes removing the object.

8. The projection display device according to claim 6, further comprising:
a display control unit that causes a display device mounted in the vehicle to display an image that is based on the image data in a state where the object detecting unit has detected the object and the driving unit has moved the protection member to the position above the cover.

9. The projection display device according to claim 5, further comprising:
a display control unit that causes a display device mounted in the vehicle to display an image that is based on the image data in a state where the object detecting unit has detected the object and the driving unit has moved the protection member to the position above the cover.

10. The projection display device according to claim 1, further comprising:
a display control unit that causes a display device mounted in the vehicle to display an image that is based on the image data in a state where the object detecting unit has detected the object and the driving unit has moved the protection member to the position above the cover.

11. The projection display device according to claim 1, wherein
the protection member allows the light that has been spatially modulated to pass therethrough.

12. A projection display device according to claim 1,
wherein the object approaching the front surface of the cover is a object that is to adhere to a surface of the protection member.

13. An operation method for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a protection member that is movable and is for protecting the cover,
the operation method comprising:
an object detection step of detecting an object approaching a front surface of the cover; and
a driving step of moving the protection member to a position above the cover and causing the protection member to cover the cover when the object detection step detects an object, and of leaving the protection member retracted from the position above the cover to expose the cover when the object detection step does not detect an object.

14. The operation method for the projection display device according to claim 13, further comprising:
an object removal step of removing an object adhered to a front surface of the protection member in a state where the driving step has moved the protection member to the position above the cover.

15. The operation method for the projection display device according to claim 14, further comprising:
a step of retracting the protection member from the position above the cover after the object removal step is completed.

16. The operation method for the projection display device according to claim 13, wherein
the protection member is inclined with respect to a plane perpendicular to a projection direction of the light projected through the opening portion, and
the projection display device further has a discharge unit to which an object adhered to a front surface of the protection member is to be discharged, the discharge unit being provided at a position facing an end portion closer to the opening portion out of end portions of the protection member in an inclination direction in a state where the protection member covers the cover.

17. The operation method for the projection display device according to claim 16, further comprising:
an object removal step of moving the object adhered to the front surface of the protection member to the discharge unit to remove the object in a state where the driving step has moved the protection member to the position above the cover.

18. The operation method for the projection display device according to claim 13, further comprising:
a display control step of causing a display device mounted in the vehicle to display an image that is based on the image data in a state where the driving step has moved the protection member to the position above the cover.

19. The operation method for the projection display device according to claim 13, wherein
the protection member allows the light that has been spatially modulated to pass therethrough.

20. A non-transitory computer readable recording medium storing an operation program for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a protection member that is movable and is for protecting the cover,
the operation program causing a computer to execute:
a driving step of moving the protection member to a position above the cover and causing the protection member to cover the cover when an object approaching a front surface of the cover is detected, and of leaving the protection member retracted from the position above the cover to expose the cover when the object is not detected.

* * * * *